(12) United States Patent
Griffin et al.

(10) Patent No.: US 10,871,837 B2
(45) Date of Patent: Dec. 22, 2020

(54) WEARABLE ELECTRONIC DEVICES HAVING A ROTATABLE INPUT STRUCTURE

(71) Applicant: GOOGLE LLC, Mountain View, CA (US)

(72) Inventors: Jason T. Griffin, Kitchener (CA); Steven Henry Fyke, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/409,949

(22) Filed: May 13, 2019

(65) Prior Publication Data

US 2019/0346941 A1 Nov. 14, 2019

Related U.S. Application Data

(60) Provisional application No. 62/671,248, filed on May 14, 2018.

(51) Int. Cl.
| | |
|---|---|
| *G06F 3/0362* | (2013.01) |
| *G08C 17/00* | (2006.01) |
| *G06F 3/038* | (2013.01) |
| *G06F 3/02* | (2006.01) |
| *G02B 27/01* | (2006.01) |

(52) U.S. Cl.
CPC .......... *G06F 3/0362* (2013.01); *G06F 3/0202* (2013.01); *G06F 3/0383* (2013.01); *G08C 17/00* (2013.01); *G02B 27/017* (2013.01); *G06F 2203/0331* (2013.01); *G06F 2203/0384* (2013.01); *G08C 2201/32* (2013.01)

(58) Field of Classification Search
CPC .... G06F 3/0362; G06F 3/0202; G06F 3/0383; G06F 2203/0384; G06F 2203/0331; G08C 17/00; G02B 27/017
See application file for complete search history.

(56) References Cited

U.S. PATENT DOCUMENTS

| | | | |
|---|---|---|---|
| 2011/0210931 A1* | 9/2011 | Shai | G06F 3/0338 345/173 |
| 2016/0306422 A1* | 10/2016 | Parham | G06F 3/012 |
| 2016/0313798 A1* | 10/2016 | Connor | A61B 5/0488 |

* cited by examiner

*Primary Examiner* — Robert J Michaud

(57) ABSTRACT

Wearable electronic devices having rotatable input manipulable are described herein. The wearable electronic devices include a body defining an aperture that is sized and shaped to receive a finger of a user. The wearable electronic devices also include a processor housed by the body, a first input structure rotatably coupled to the body and controllably rotatable about the body by a second finger of the user and manipulable thereby, a detector system carried by the body and communicatively coupled to the processor to detect rotations of the first input structure about the body, a transmitter communicatively coupled to the processor to transmit signals to an external electronic device in response to rotations of the first input structure about the body, and, optionally, a power source communicatively coupled to the processor, the detector system, and the transmitter to provide power to at least the processor, the detector system, and the transmitter.

19 Claims, 9 Drawing Sheets

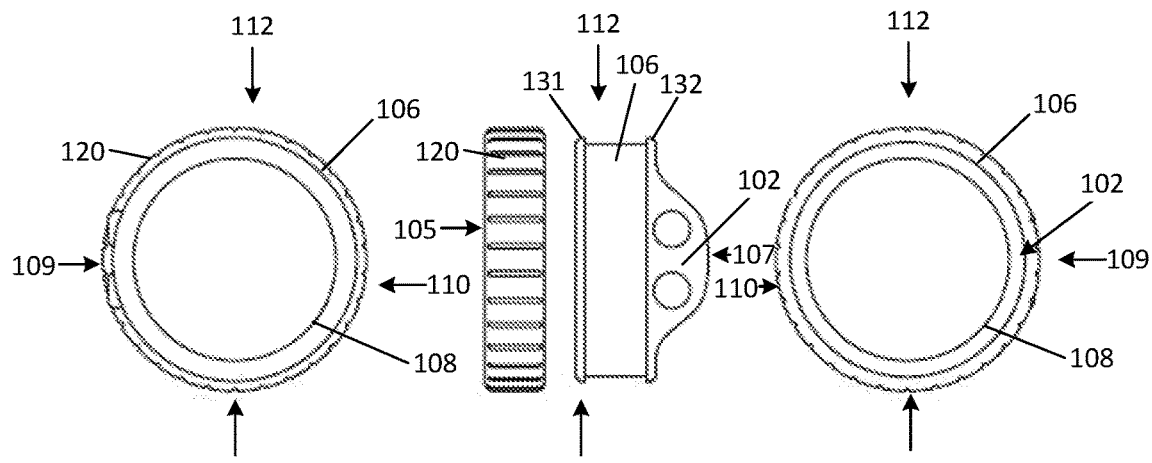
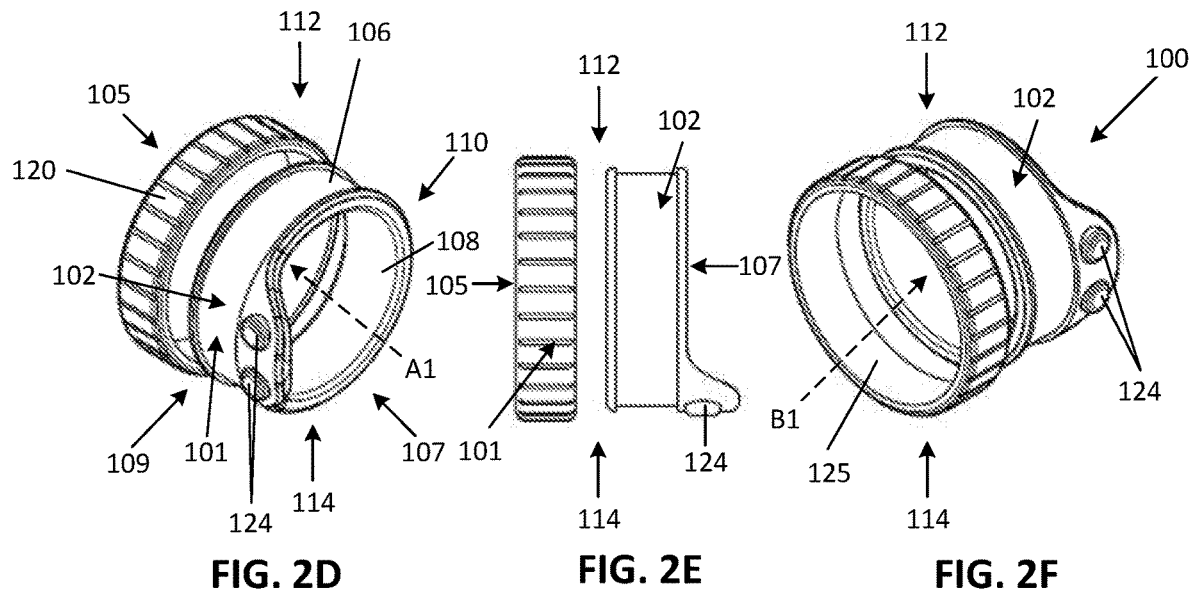

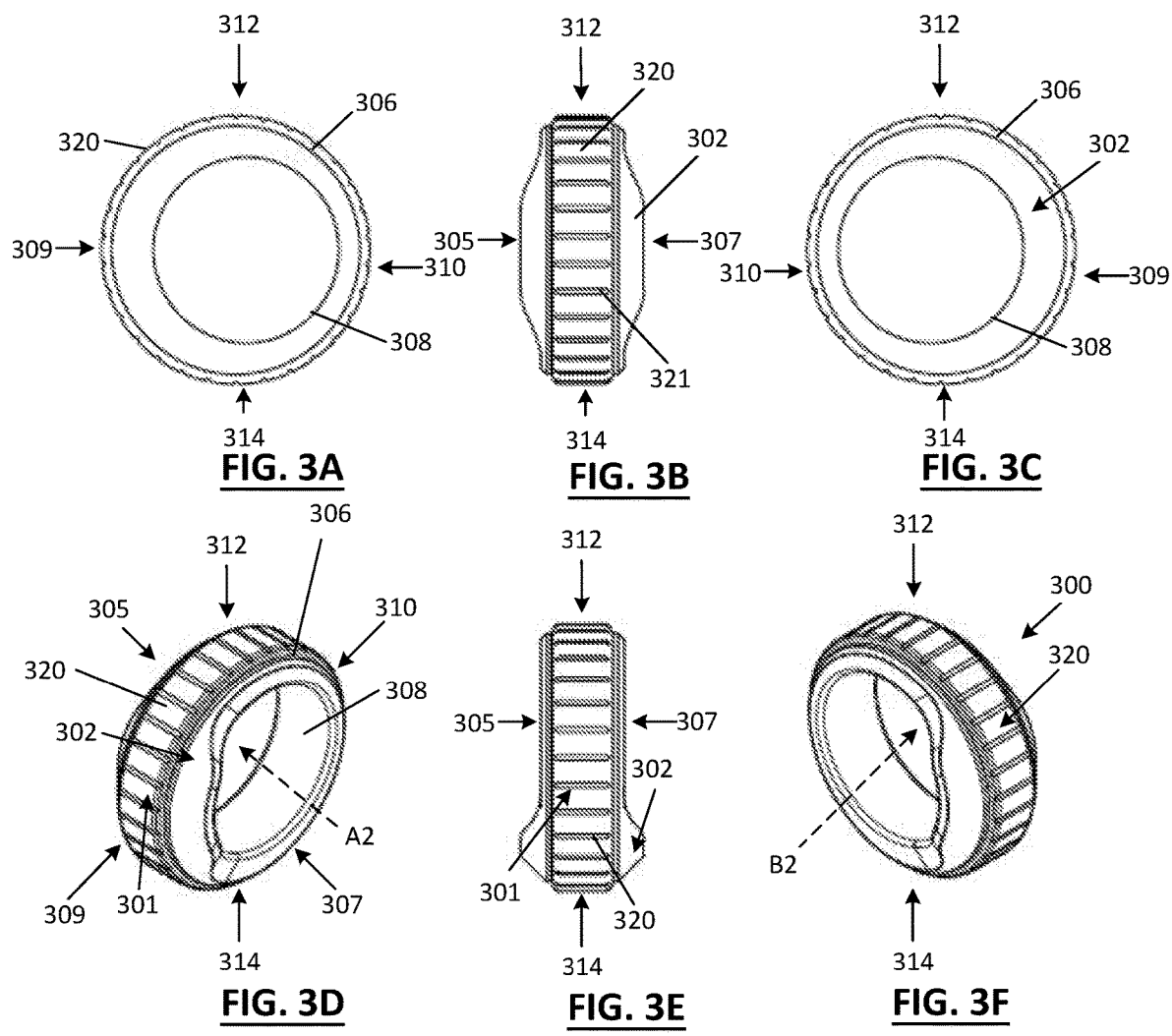

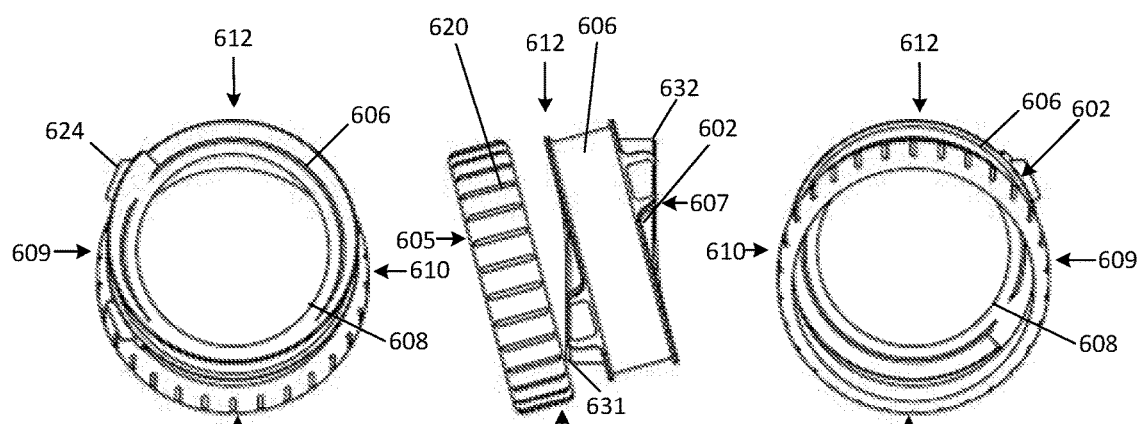
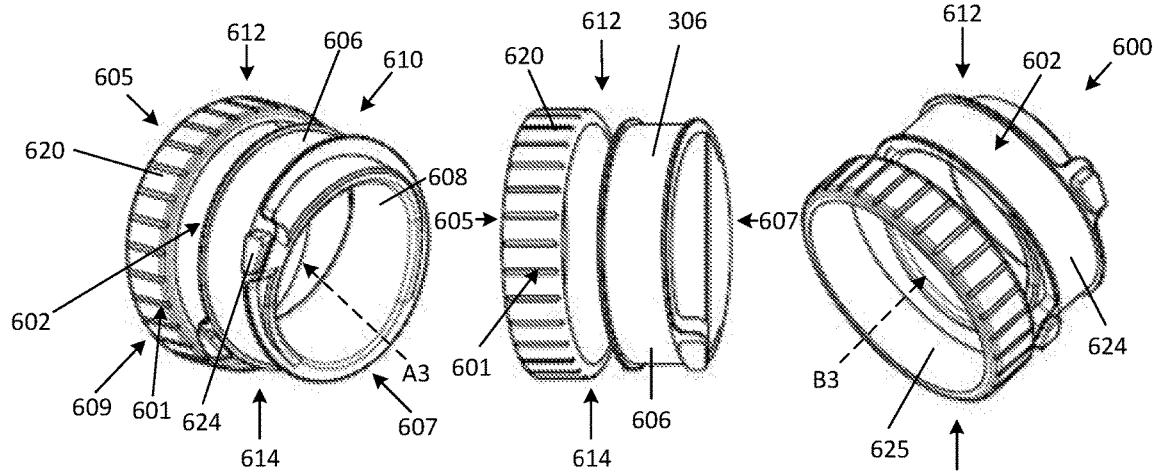

WEARABLE ELECTRONIC DEVICES HAVING A ROTATABLE INPUT STRUCTURE

BACKGROUND

Technical Field

The present systems, devices, and methods generally relate to wearable electronic devices and particularly relate to wearable electronic devices having a rotatable input structure.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (e.g., batteries, super- or ultra-capacitors, or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, often visible to others, and generally present for long periods of time, form factor (i.e., size, geometry, and appearance) is a major design consideration in wearable electronic devices.

Wearable Heads-Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Microsoft Hololens® just to name a few.

BRIEF SUMMARY

The various implementations and embodiments described herein generally relate to wearable electronic devices with a rotatable input structure.

A wearable electronic device wearable on a first finger of a user may be summarized as including: a body defining an aperture therethrough, the aperture sized and shaped to receive the first finger of the user; a processor housed in the body; a first input structure rotatably coupled to the body, the first input device controllably rotatable about the body by a second finger of the user; a detector system carried by the body and communicatively coupled to the processor, the detector system to detect rotations of the first input structure about the body; a transmitter communicatively coupled to the processor, the transmitter to transmit signals to an external electronic device in response to rotations of the first input structure about the body; and, optionally, a power source communicatively coupled to the processor, the detector system, and the transmitter to provide power to at least the processor, the detector system, and the transmitter.

The first input structure may be at least partially disposed at an outer peripheral surface of the body.

The first input structure may be annular about a center axis of the first input structure and controllably rotatable about the center axis of the first input device.

The center axis of the first input structure may be coaxial with a center axis of the body.

The center axis of the first input device may intersects a center axis of the body.

The wearable electronic device may include a second input structure carried by the body.

The second input structure may include a button.

The second input structure may be laterally offset from the first input structure on the body.

The second input structure may extend from an outer surface of the body towards an inner surface of the first input structure and be positioned between the first input structure and the body.

The second input structure may extend from the body at a position between two lateral edges of the body.

The detector system may be an analog system.
The detector system may be a digital system.
The detector system may be a combination of an analog system and a digital system.

The detector system may include an optical sensor carried by one of an outer surface of the body and an inner surface of the first input structure. The optical sensor may be to sense markings detectable by the optical sensor placed on the other of the outer surface of the body and the inner surface of the first input structure.

The detector system may include a mechanical switch carried by one of an outer surface of the body and an inner surface of the first input structure. The mechanical switch may be intermittently activatable by one or more strikers carried by the other of the outer surface of the body and the inner surface of the first input structure.

The detector system may include at least one magnet carried by one of an outer surface of the body or an inner surface of the first input structure and a hall effect sensor carried by the other of the outer surface of the body or the inner surface of the first input structure.

The body may have an annular shape to be worn on the first finger of the user.

Rotation of the first input structure about the body may provide tactile feedback to the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIGS. 2A to 2F are exploded right side, front, left side, right side perspective, top and left side perspective views, respectively, of the wearable electronic device of FIG. 1.

FIGS. 3A to 3F are right side, front, left side, right side perspective, top and left side perspective views of a wearable electronic device having a rotatable input structure, according to another embodiment.

FIGS. 7A to 7F are exploded right side, front, left side, right side perspective, top and left side perspective views, respectively, of the wearable electronic device of FIG. 6.

DETAILED DESCRIPTION

Figure 1A:
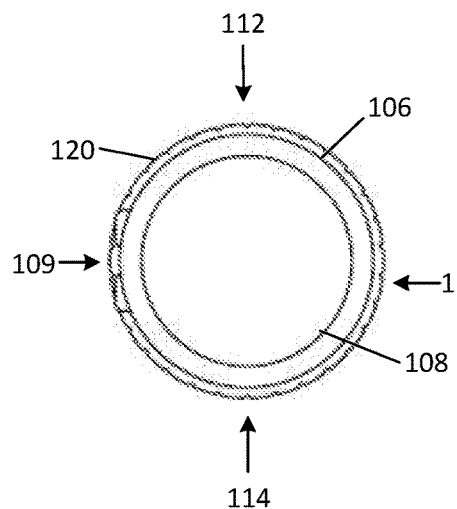
FIGS. 1A to 1F are right side, front, left side, right side perspective, top and left side perspective views, respective, of a wearable electronic device having a rotatable input structure, according to one embodiment.
Figure 1B:
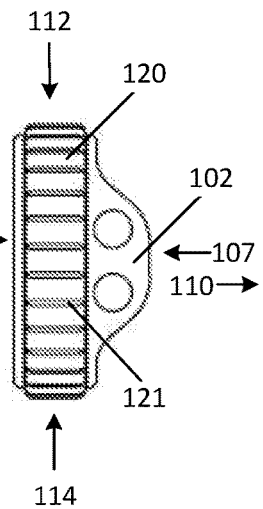
Figure 1C:
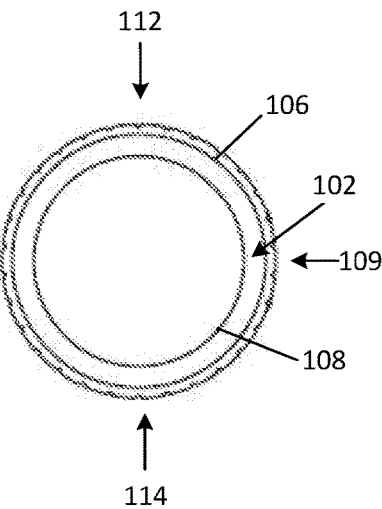
Figure 1D:
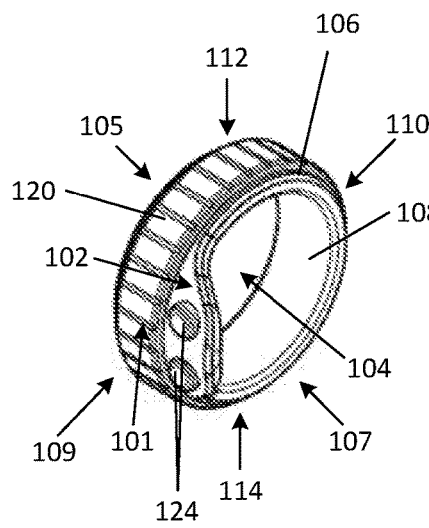
Figure 1E:
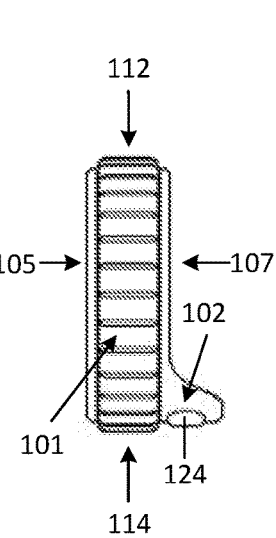
Figure 1F:
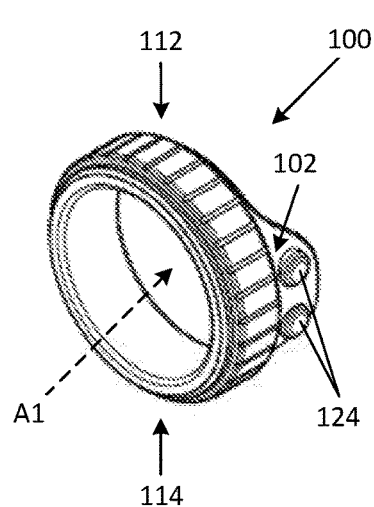
Figure 4A:
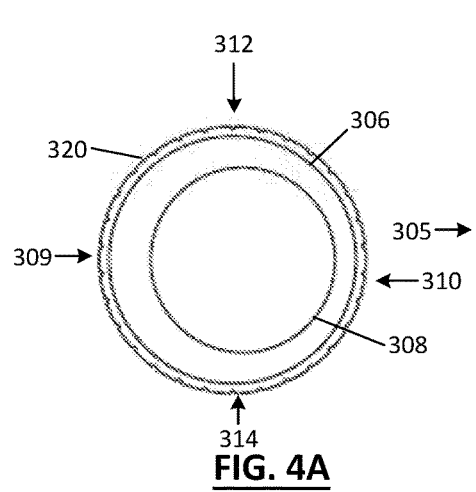
FIGS. 4A to 4F are exploded right side, front, left side, right side perspective, top and left side perspective views, respectively, of the wearable electronic device of FIG. 3.
Figure 4B:
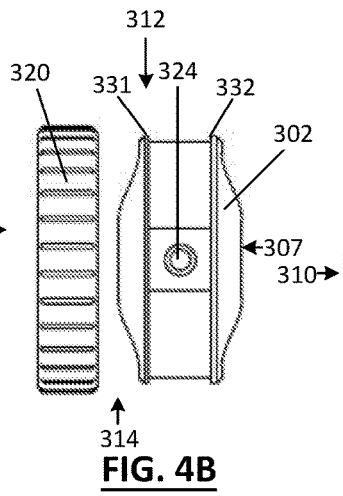
Figure 4C:
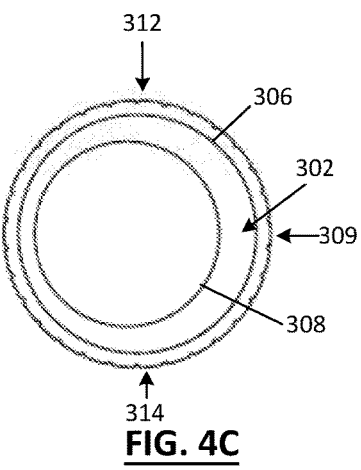
Figure 4D:
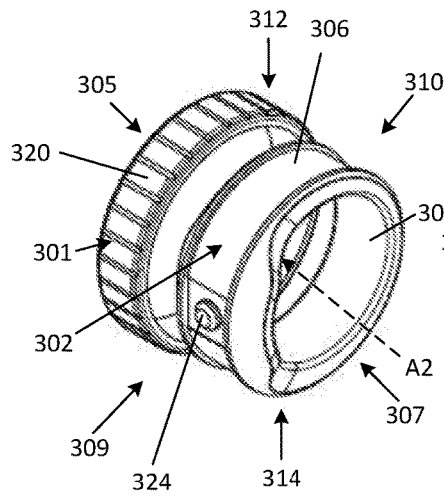
Figure 4E:
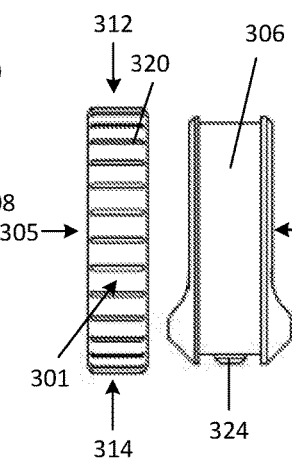
Figure 4F:
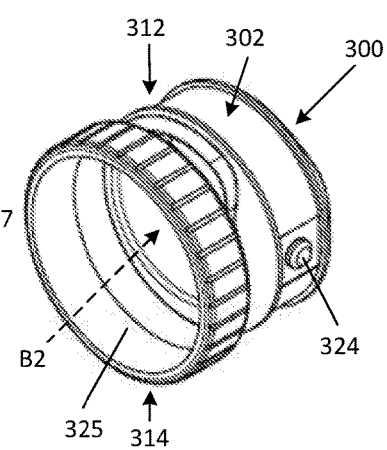
Figure 5A:
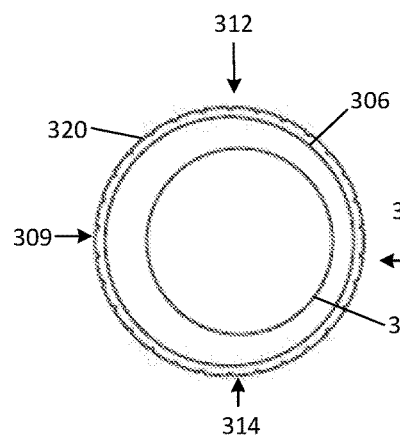
FIGS. 5A to 5F are exploded right side, front, left side, right side perspective, top and left side perspective views, respectively, of a wearable electronic device having a rotatable input structure, according to another embodiment.
Figure 5B:
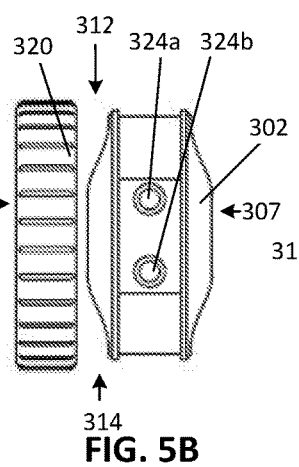
Figure 5C:
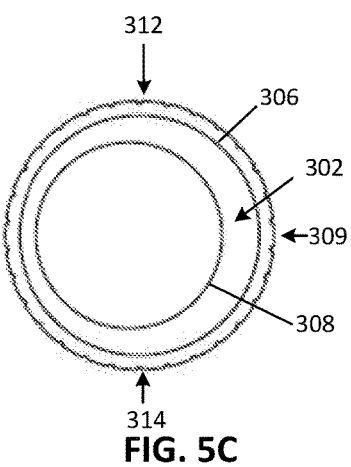
Figure 5D:
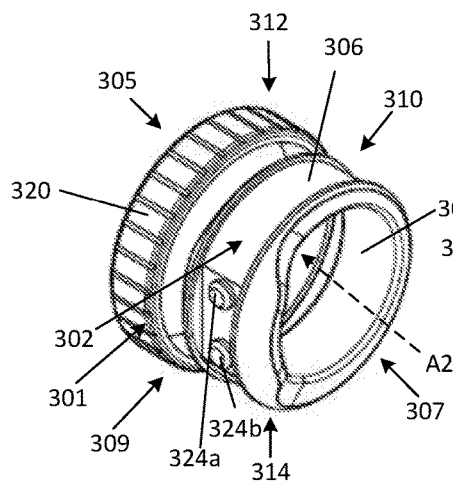
Figure 5E:
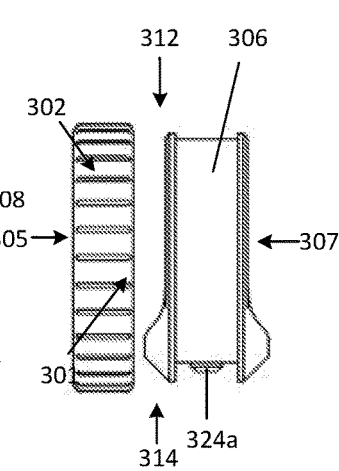
Figure 5F:
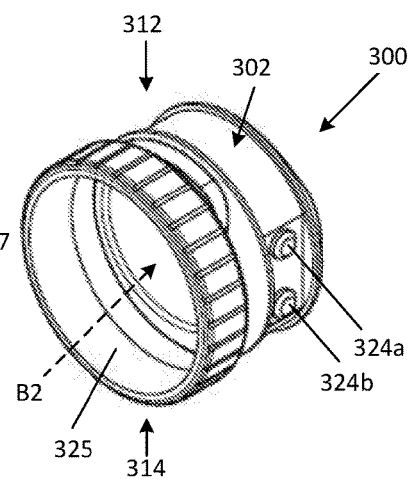
Figure 6A:
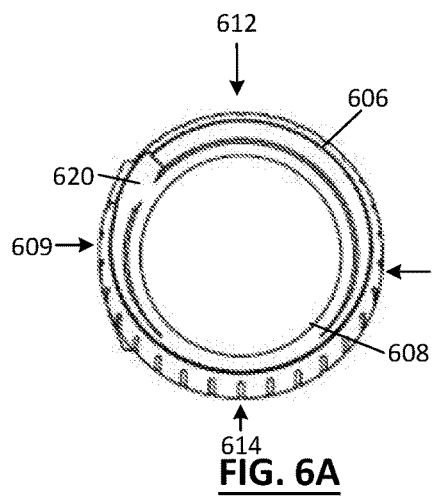
FIGS. 6A to 6F are right side, front, left side, right side perspective, top and left side perspective views, respectively, of a wearable electronic device having a rotatable input structure, according to another embodiment.
Figure 6B:
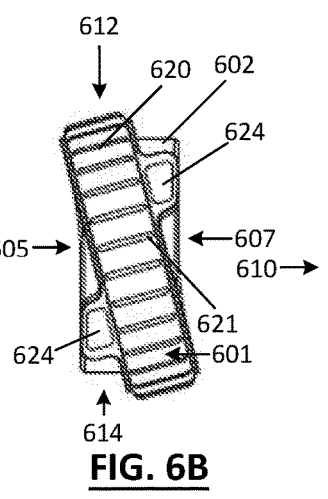
Figure 6C:
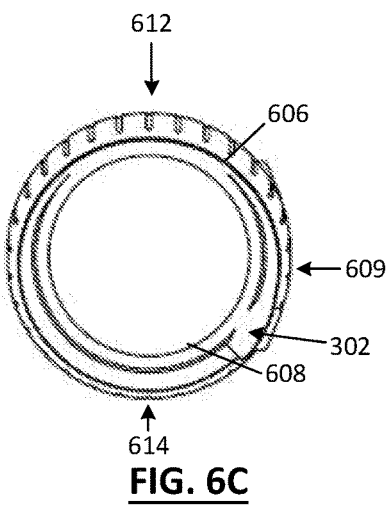
Figure 6D:
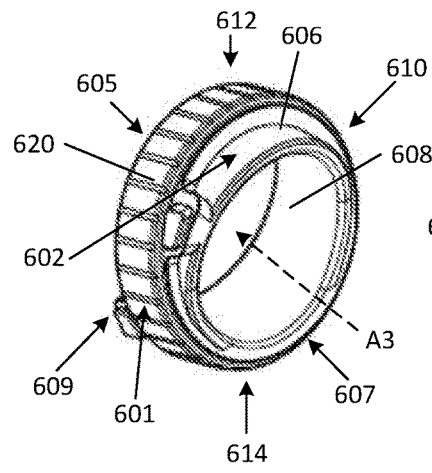
Figure 6E:
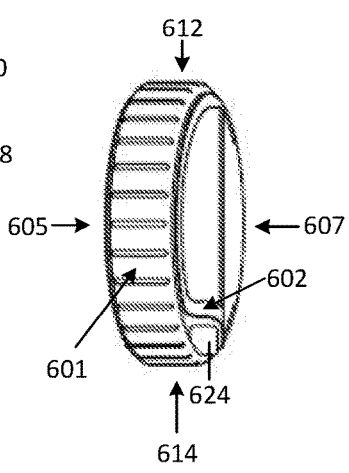
Figure 6F:
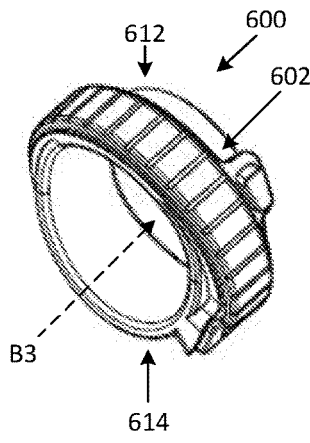

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the implementations and embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementation or embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Herein, the term "carried by" should be understood to refer to physical coupling of two objects, the physical coupling including coupling on, within, along, flush with, in a recess, etc.

A user may have more than one wearable electronic device and it can be desirable to have wearable electronic devices of different sizes for comfort. When such wearable electronic devices are used and communicate with another electronic device, it can be desirable to have the communication hardware of the wearable electronic device be transferable between wearable electronic devices.

One or more implementations described herein include a wearable electronic device that is configured to be worn on a first finger of a user. The wearable electronic device includes one or more input structures for capturing user input and/or for providing output to the user. Herein, the term "finger" means any finger of a user, including a thumb, an index finger, a middle finger, a ring finger, and a pinky finger of either hand of the user. In one or more implementations, the wearable electronic device is worn on the user's index finger.

The wearable electronic device may communicate with one or more second wearable electronic devices via a communication channel, for instance a communication network, as further described below.

The wearable electronic devices described herein have a rotatable first input structure. In one or more implementations, the wearable electronic device can be configured so that the first input structure rotates about a body of the wearable electronic device. The first input structure in manipulable, and may be rotated, for example, by a second finger of the user while the wearable electronic device is worn on a first finger of the user on the same hand. For instance, the wearable device may be worn on a user's index finger or on a ring finger and the input structure may be rotated by the user's thumb. In this manner, the user may easily provide inputs using the first input structure rotating the input structure with their thumb.

The wearable electronic device may employ a button, a joystick, a capacitive touch sensor, a lever, a dial, a microphone, or motion sensors as a user input device to capture user input via touches, audio commands, or hand gestures.

Referring to FIGS. 1A to 1F, illustrated therein are right side, front, left side, right side perspective, top and left side perspective views, respectively, of a wearable electronic device 100 having a rotatable input structure 101. Wearable electronic device 100 has a body 102 and input structure 101 is controllably rotatable about the body 102. In one or more implementations, body 102 houses one or more electronic components (such as but not limited to a processor, memory, sensors, a charging member, etc., as further described below). Body 102 defines an aperture 104 capable of receiving a user's finger. Body 102 has a first side 105, a second side 107 opposed to the first side 105, a first end 109 and a second end 110 opposed to the first end 109, and a top portion 112 and a bottom 114 portion opposed to the top portion 112.

Body 102 generally has an annular shape and includes an outer surface 106 and an inner surface 108. The inner surface 108 is sized and/or shaped to conform to the finger of the user. The inner surface 108 thereby rests against the user's finger when the device 100 is worn by the user. Wearable electronic device 100 may be available in a variety of sizes for accommodating various finger sizes and/or various types of fingers.

In one or more implementations, the body 102 is made from a rigid or semi-rigid material such as a metal or a plastic. For instance, the body 102 may be made of gold, silver, platinum, or any other appropriate metal.

In the implementation shown in FIGS. 1 and 2, input structure 101 is rotatably mounted to outer surface 106 of body 102. Input structure 101 is at least partially disposed at an outer peripheral surface of the body and configured to rotate about a center axis B1 extending through a center of aperture 104 to receive inputs from a user. The input structure 101 can assume a wide variety of forms appropriate for manipulation by a user's finger (e.g., by a finger other than the finger upon which the wearable electronic device is worn). For example, input structure 101 can generally have an annular shape and be sized and shaped to rotatably mount on outer surface 106 of body 102. For instance, as shown in the implementation shown in FIGS. 1 and 2, input structure 101 may be rotatably mounted to body 102 to rotate around body 102. In one or more implementations, input structure 101 can be mounted to surround outer surface 106 of body 102 and have a center axis B1 (see FIG. 2F) passing through a center of the input structure 101 that is co-axial with a center axis A1 (see FIG. 2D) of body 102. In this configuration, input structure 101 may be aligned with body 102 such that when input structure 101 is mounted to body 102, the input structure 101 does not extend beyond an outer (e.g., lateral) edge of outer surface 106 of body 102. Input structure 101 has an outer surface 120 that may include indentations 121 for manipulation by a finger of a user.

In one or more implementations, wearable electronic device 100 includes a detector system (see FIG. 8) to detect the rotation of input structure 101 about body 102 for a user to provide an input to the wearable electronic device 100. The detector system to detect rotations of input structure 101 about body 102 could be an analog detector system, a digital detector system, or a combination of both.

In one or more implementations, wearable electronic device 100 includes an analog detector system. For instance, one of body 102 and input structure 101 may include an optical sensor that detects the rotation of input structure 101 about body 102. In this implementation, an optical sensor may be carried by one of the body 102 (e.g. outer surface 106 of body 102) or input structure 101 (e.g., inner surface 125 of the input structure 101). Corresponding markings detectable by the optical sensor could be placed on the outer surface 106 of body 102 and the inner surface 125 of the input structure 101 to detect the rotation of input structure 101 about the body 102.

In other implementations, a mechanical switch system could be used as a digital detector system. For instance, one or more mechanical switches could be carried by one of the body 102 (e.g. outer surface 106 of body 102) or input structure 101 (e.g. inner surface 125 of the input structure 101) and the switch could be intermittently activated by one or more strikers carried by the other of the outer surface 106 of body 102 or inner surface 125 of the input structure 101. As the strikers pass by the mechanical switch and activate the mechanical switch, a digital signal could be generated and used to detect the rotation of the input structure 101 about the body 102.

In one or more implementations, a magnetic system with a Hall Effect switch could be used as either a digital detector system or as a combined analog and digital detector system to detect the rotation of the input structure 101 about the body 102. A Hall effect sensor is a transducer that varies its output voltage in response to a magnetic field. Hall effect sensors can be used for proximity switching, positioning, speed detection and current sensing applications. For instance, one or more magnets could be positioned around the input structure 101 (e.g., either on the surface 125 or within the input structure 101 adjacent to the inner surface 125) and a sensor (e.g., a hall effect sensor) can be positioned around the body 102 (e.g., either on the surface 106 or within the body 102 adjacent to the surface 106). The hall effect sensor can detect when a magnet passes the sensor (e.g., when the input structure 101 is rotating). By counting the number of times a magnet passes the sensor, the Hall Effect sensor can generate a digital signal. The Hall Effect sensor can also detect an approaching magnet and a magnet moving away from the sensor based on a changing signal strength from the magnet, and generate an analog signal therefrom.

Further, in one or more implementations, body 102 may include a magnet (e.g., a non-moving magnet) or a piece of steel and the input device may include a magnet or a piece of steel. Attraction between the magnet and the piece of steel may create a detent effect that can create a detent effect.

A user can actuate the input structure 101 by engaging and/or applying a force to the surface 101. The input structure 101 may be configured to be positively actuated only upon the contact of a certain percentage of the actuation surface 122 or certain minimum pressure on a pressure sensor-type switch to avoid unintended activation.

An input provided to the wearable electronic device 100 by the user engaging input structure 101. For instance, a user can engage the input structure 101 when a finger of the user makes physical contact with input structure 101 and actuates the input structure 101. In one or more implementations, user engagement with the input structure 101 results in rotation of the input structure 101 about the body 102. The physical actuation (e.g., rotation) of the input structure 101 produces a signal that is received and recognized by a processor (described below) of the device. In one or more implementations, the physical actuation of the input structure 101 is translated by the processor into a computer-readable form. The processor then compares the rotation of the input structure 101 by the user to a plurality of stored manipulations based on the input.

In one or more implementations, body 102 may also include one or more second input structure (e.g., buttons) 122 carried by the body 102. In one or more implementations, second input structure 122 may be buttons having a mechanical switch and including a depressible component that makes contact with a conductive element in response to a user applying a force to the depressible component. Upon release of the force applied by the user, the depressible component may thereafter return to a default position in response to an expansion of a spring or other biasing element. In one or more implementations, the input structure 101 may be electrically operated by sensing touch or proximity (e.g., by measuring capacitance of a user's finger). Any type of button is within the scope of the wearable electronic device 100, and one button 124 may be a first type while another button 124 may be a second type. While two buttons 124 are illustrated in this implementation, any number of buttons are within the scope of the wearable electronic device 100 described herein.

Second input structure 122 can be mechanical, electromechanical, and/or sensor (e.g., a membrane sensor)-based, and in more general terms can provide an actuation surface 123 for receiving a user-applied actuation force or action.

In one or more implementations, a transmitter is also included in the wearable electronic device 100 (see for example FIG. 8) and is communicatively coupled to a processor, the transmitter transmit signals to an external electronic device in response to rotations of the first input structure 101 about the body 102. The transmitter may include a wireless transmitter to wirelessly transmit a signal to the external electronic device.

In one or more implementations, a power system (see FIG. 8) is also included in the wearable electronic device 100. The power system generally provides electrical power to the various components of the wearable electronic device 100 (not all connections shown). For instance, in one or more implementations, the power system (e.g., power source) is communicatively coupled to the processor and the transmitter to provide power to at least the processor and the transmitter. The power system optionally includes a power management system, one or more power sources (e.g., primary battery cells, secondary power cells, fuel cells, super- or ultra-capacitors), a recharging system, a power failure detection circuit, a power converter or inverter, a power status indicator (e.g., a light-emitting diode (LED)) and any other components associated with the generation, management and distribution of power in portable devices. The recharging system may receive wired power (from, e.g., a micro-USB charger) or wireless power via receipt of electromagnetic waves by one or more inductors or inductive interfaces, and provide the electrical power to the one or more power sources via one or more wired or electrically conductive paths.

In one or more implementations, an indicator (not shown) may also be carried by the body 102 of the wearable electronic device 100. The indicator may provide an indication when an input is received by the processor. The indicator may be communicatively coupled to the power system (e.g., power source) and include at least one component selected from a group consisting of: a speaker, a light source, a sound generator, and a haptic feedback device. In one or more implementations, rotation of input device 101 about body 102 may provide tactile feedback to the user. Tactile feedback may include any force feedback provided to the user relating to the sense of touch, such as but not limited to vibration.

Turning to FIGS. 2A to 2F, illustrated therein are exploded right side, front, left side, right side perspective, top and left side perspective views, respectively, of the wearable electronic device 100 of FIG. 1.

In this embodiment, input structure 101 is rotatably mounted between two lateral edges 131, 132 of body 102. Lateral edges 131, 132 may extend outwardly from surface 106 of body 102 and surround body 102.

Buttons 124 extend from surface 106 in a direction towards second side 107 of body 102.

Referring now to FIGS. 3A to 3F, illustrated therein are right side, front, left side, right side perspective, top and left side perspective views, respectively, of a wearable electronic device 300 having a rotatable input structure 301. Wearable electronic device 300 has a body 302 and input structure 301 is controllably rotatable about the body 302. In one or more implementations, body 302 houses one or more electronic components (such as but not limited to a processor, memory, sensors, a charging member, etc., as further described below). Body 302 defines an aperture 304 capable of receiving a user's finger. Body 302 has a first side 305, a second side 307 opposed to the first side 305, a first end 309 and a second end 310 opposed to the first end 309, and a top portion 312 and a bottom 314 portion opposed to the top portion 312.

Body 302 generally has an annular shape and includes an outer surface 306 and an inner surface 308. The inner surface 308 is sized and/or shaped to conform to the finger of the user. The inner surface 308 thereby rests against the user's finger when the device 300 is worn by the user. Wearable electronic device 300 may be available in a variety of sizes for accommodating various finger sizes and/or various types of fingers.

In one or more implementations, the body 302 is made from a rigid or semi-rigid material such as a metal or a plastic. For instance, the body 302 may be made of gold, silver, platinum, or any other appropriate metal.

In the implementation shown in FIGS. 3 and 4, input structure 301 is rotatably mounted to outer surface 306 of body 302. Input structure 301 is mounted to rotate about a center axis B2 extending through a center of aperture 304 to receive inputs from a user. The input structure 301 can assume a wide variety of forms appropriate for manipulation by a user's finger (e.g., by a finger other than the finger upon which the wearable electronic device is worn), and hence may in some instance be referred to as a manipulable input structure. For example, input structure 301 can generally have an annular shape and be sized and shaped to rotatably mount on outer surface 306 of body 302. For instance, as shown in the implementation shown in FIGS. 3 and 4, input structure 301 may be rotatably mounted to body 302 to rotate around body 302. In one or more implementations, input structure 301 can be mounted to surround outer surface 306 of body 302 and rotate about a center axis B2 (see FIG. 3F) passing through a center of the input structure 301 that is co-axial with center axis A2 (see FIG. 3D) of body 302. In this configuration, input structure 301 may be aligned with body 302 such that when input structure 301 is mounted to body 302, the input structure 301 does not extend beyond an outer edge of outer surface 306 of body 302. Input structure 301 has an outer surface 320 that may include indentations 321 for manipulation by a finger of a user.

Wearable electronic device 300 includes a detector system (see FIG. 8) to detect the rotation of input structure 301 about body 302 for a user to provide an input to the wearable electronic device 300. The detector system to detect rotations of input structure 301 about body 302 could be an analog detector system, a digital detector system, or a combination of both.

In one or more implementations, wearable electronic device 300 includes an analog detector system. For instance, one of body 302 and input structure 301 may include an optical sensor (e.g., optical rotational encoder) that detects the rotation of input device 301 about body 302. In this implementation, an optical sensor may be carried by one of outer surface 306 of body 302 or an inner surface 325 of the input structure 301. Corresponding markings (e.g., printed, inscribed, etched) detectable by the optical sensor could be placed on the other surface of the outer surface 306 of body 302 and the inner surface 325 of the input device 301 to detect the rotation of input structure 301 about the body 302.

In other implementations, a mechanical switch system (e.g., rotary switch) could be used as a digital detector system. For instance, one or more mechanical switches could be carried by one of outer surface 306 of body 302 or an inner surface 325 of the input device 301 and the switch could be intermittently activated by one or more strikers carried by the other of the outer surface 306 of body 302 or an inner surface 325 of the input structure 301. As the strikers pass by the mechanical switch and activate the mechanical switch, a digital signal could be generated and used to detect the rotation of the input structure 301 about the body 302.

In other implementations, a magnetic system with a Hall Effect switch could be used as either a digital detector system or as a combined analog and digital detector system to detect the rotation of the input structure 301 about the body 302. A Hall effect sensor is a transducer that varies its output voltage in response to a magnetic field. Hall effect sensors can be used for proximity switching, positioning, speed detection and current sensing applications. For instance, one or more magnets could be positioned around the input device 301 (e.g., either on the surface 325 or within the input structure 301 adjacent to the inner surface 325) and a sensor (e.g., a Hall effect sensor) can be positioned around the body 302 (e.g., either on the surface 306 or within the body 302 adjacent to the surface 306). The Hall effect sensor can detect when a magnet passes the sensor (e.g., when the input structure 301 is rotating). By counting the number of times a magnet passes the sensor, the Hall Effect sensor can generate a digital signal. The Hall Effect sensor can also detect an approaching magnet and a magnet moving in away from the sensor based on a changing signal strength from the magnet, and generate an analog signal therefrom. Alternatively, a Reed switch may be employed.

Further, in one or more implementations, body 302 may include a magnet (e.g., a non-moving magnet) or a piece of steel and the input device may include a magnet or a piece of steel. Attraction between the magnet and the piece of steel may create a detent effect that can create a detent effect.

An input can be provided to the wearable electronic device 300 by the user engaging input structure 301. For instance, a user can engage the input structure 301 when a finger of the user makes physical contact with input device 301 and actuates the input structure 301. In one or more implementations, user engagement with the input structure 301 results in rotation of the input structure 301 about the body 302. The physical actuation (e.g., rotation) of the input structure 301 produces a signal that is received and recognized by a processor (described below) of the device or some other circuitry (e.g., analog-to-digital converter). In one or more implementations, the physical actuation of the input structure 301 is translated by the processor into a computer-readable form. The processor then compares the rotation of the input structure 301 by the user to a plurality of stored manipulations based on the input.

In one or more implementations, body 302 may also carry one or more second input device(s) (e.g., buttons) 324. In one or more implementations, second input structure 324 may be a button having a mechanical switch (e.g., momentary contact switch) and including a depressible component that makes contact with a conductive element in response to a user applying a force to the depressible component. Upon release of the force applied by the user, the depressible component may thereafter return to a default position in response to an expansion of a spring or other biasing element.

Referring now to FIG. 5, in another implementation, second input structure 324 may include two buttons.

Any type of button or key or switch is within the scope of the wearable electronic device 300, and one button 324 may be a first type while, in embodiments where second input device 324 includes more than one button, another button 324 may be a second type. While two buttons 324 are illustrated in FIG. 5, any number of buttons are within the scope of the wearable electronic device 300 described herein.

Second input structure 324 can be mechanical, electromechanical, and/or sensor (e.g., a membrane sensor)-based, and in more general terms can provide for receiving a user-applied actuation force or action.

Turning to FIGS. 4A to 4F, illustrated therein are exploded right side, front, left side, right side perspective, top and left side perspective views, respectively, of the wearable electronic device 300 of FIG. 3.

In this implementation, input device 301 is rotatably mounted between two body edges 331, 332 of body 302. Body edges 331, 332 extend outwardly from surface 306 of body 302 and surround body 302.

Buttons 324 extend from surface 306 in an outwardly direction and are to be covered by input structure 301 when input structure 301 is mounted to the body 302. Second input structure 324 extends from surface 306 of body 302 towards inner surface 325 of input device 301 when input structure 301 is mounted to body 302. In this regard, for a user to actuate second input structure 324, the user must apply a force to the outer surface 325 of input structure 301 in a direction towards the aperture 304 of body 302. Pressure applied to the outer surface 325 adjacent to the second input structure 324 will be transferred to the second input structure 324 and second input structure 324 can be depressed.

Turning to FIGS. 5A to 5F, illustrated therein are exploded right side, front, left side, right side perspective, top and left side perspective views, respectively, of the wearable electronic device 300 of FIG. 3, according to another implementation. In this implementation, two buttons 324 are shown. Here, both buttons 324a and 324b are carried by first end 309 of the body 302. In this position, each of the second input structures may be easily manipulated by a user's thumb when the wearable electronic device 300 is worn on the first (e.g., pinky) finger of the user (as is intended). Buttons 324a and 324b may be actuated independently or actuated coincidently (i.e., at the same time) to provide inputs to the processor for controlling an external device.

Referring now to FIGS. 6A to 6F, illustrated therein are right side, front, left side, right side perspective, top and left side perspective views, respectively, of a wearable electronic device 600 having a rotatable input structure 601. Wearable electronic device 600 has a body 602 and input structure 601 is controllably rotatable about the body 602. In one or more implementations, body 602 houses one or more electronic components (such as but not limited to a processor, memory, sensors, a charging member, etc., as further described below). Body 602 defines an aperture 604 capable of receiving a user's finger. Body 602 has a first side 605, a second side 607 opposed to the first side 605, a first end 609 and a second end 610 opposed to the first end 609, and a top portion 612 and a bottom portion 614 opposed to the top portion 612.

Body 602 generally has an annular shape and includes an outer surface 606 and an inner surface 608. The inner surface 608 is sized and/or shaped to conform to the finger of the user. The inner surface 608 thereby rests against the user's finger when the device 600 is worn by the user. Wearable electronic device 600 may be available in a variety of sizes for accommodating various finger sizes and/or various types of fingers.

In one or more implementations, the body 602 is made from a rigid or semi-rigid material such as a metal or a plastic. For instance, the body 602 may be made of gold, silver, platinum, or any other appropriate metal.

In the implementation shown in FIGS. 6 and 7, input structure 601 is rotatably mounted to outer surface 606 of body 602. Input structure 601 is mounted to rotate about a center axis B3 extending through a center of aperture 604 to receive inputs from a user. The input structure 601 can assume a wide variety of forms appropriate for manipulation by a user's finger (e.g., by a finger other than the finger upon which the wearable electronic device is worn). For example, input structure 601 can generally have an annular shape and be sized and shaped to rotatably mount on outer surface 606 of body 602. For instance, as shown in the implementation shown in FIGS. 6 and 7, input structure 601 may be rotatably mounted to body 602 to rotate around body 602. In one or more implementations, input structure 601 can be mounted to surround at least a portion of outer surface 606 of body 602.

As input structure 601 is angularly offset from body 602, input structure 601 has center axis B3 (see FIG. 6F) passing through a center of the input device 601 that is not co-axial with center axis A3 (see FIG. 6D) of body 602. Rather, center axis B3 passes through a center of the input structure 601 and intersects center axis A3 of body 602. In this configuration, input structure 601 is not aligned with body 602 such that when input device 601 is mounted to body 602, at least a portion the input structure 601 laterally extends beyond an outer edge (e.g. edges 631 and 632) of body 602. Input structure 601 has an outer surface 620 that may include indentations 621 for manipulation by a finger of a user. In this implementation, input structure 601 may be laterally inclined relative to body 602 to provide for ergonomic manipulation of input structure 601 by a user's thumb when the wearable electronic device 600 is worn on a first finger (e.g., pinky finger) by the user.

In the implementations shown in FIGS. 6 and 7, input structure 601 is laterally inclined relative to body 602 to provide for ergonomic manipulation of input structure 601 by a user's thumb when the wearable electronic device 600 is worn on a first finger (e.g., pinky finger) of a user's right hand. The skilled person will understand that the lateral inclination of input structure 601 relative to body 602 can be changed to provide for ergonomic manipulation of input structure 601 by a user's finger when the wearable electronic device 600 is being worn on any one of the user's fingers. For instance, to be ergonomic for use when the wearable electronic device 600 is being worn on a user's right hand, the input structure 601 is shown as being laterally inclined relative to the body 602 such that a portion of the input structure 601 adjacent to bottom portion 614 is laterally offset in a direction towards second side 607 while a portion of the input structure 601 adjacent to top portion 612 is laterally offset in a direction towards first side 605. Likewise, to be ergonomic for use when the wearable electronic device 600 is being worn on a user's left hand, the input structure 601 could be oriented so that the input structure 601 is laterally inclined relative to the body 602 such that the portion of the input structure 601 adjacent to bottom portion 614 is laterally offset in a direction towards first side 605 and the portion of the input structure 601 adjacent to top portion 612 is laterally offset in a direction towards second side 607.

Wearable electronic device 600 includes a detector system (see FIG. 8) to detect the rotation of input structure 601 about body 602 for a user to provide an input to the wearable electronic device 600. The detector system to detect rotations of input structure 601 about body 602 could be an analog detector system, a digital detector system, or a combination of both.

In one or more implementations, wearable electronic device 600 includes an analog detector system. For instance, one of body 602 and input structure 601 may include an optical sensor that detects the rotation of input structure 601 about body 602. In this implementation, an optical sensor may be carried by one of outer surface 606 of body 602 or an inner surface 625 of the input structure 601. Corresponding markings detectable by the optical sensor could be placed on the other surface of the outer surface 606 of body 602 and the inner surface 625 of the input structure 601 to detect the rotation of input device 601 about the body 602. Such may include a light source (e.g., LED, infrared LED) to illuminate the markings.

In other implementations, a mechanical switch system could be used as a digital detector system. For instance, one or more mechanical switches could be carried by one of outer surface 606 of body 602 or an inner surface 625 of the input structure 601 and the switch could be intermittently activated by one or more strikers carried by the other of the outer surface 606 of body 602 or an inner surface 625 of the input structure 601. As the strikers pass by the mechanical switch and activate the mechanical switch, a digital signal could be generated and used to detect the rotation of the input structure 601 about the body 602.

In other implementations, a magnetic system with a Hall Effect switch or Reed switch could be used as either a digital detector system or as a combined analog and digital detector system to detect the rotation of the input structure 601 about the body 602. A Hall Effect sensor is a transducer that varies its output voltage in response to a magnetic field. Hall effect sensors can be used for proximity switching, positioning, speed detection and current sensing applications. For instance, one or more magnets could be positioned around the input structure 601 (e.g., either on the surface 625 or within the input structure 601 adjacent to the inner surface 625) and a sensor (e.g., a Hall effect sensor) can be positioned around the body 602 (e.g., either on the surface 606 or within the body 602 adjacent to the surface 606). The Hall effect sensor can detect when a magnet passes the sensor (e.g., when the input structure 620 is rotating). By counting the number of times a magnet passes the sensor, the Hall Effect sensor can generate a digital signal. The Hall Effect sensor can also detect an approaching magnet and a magnet moving in away from the sensor based on a changing signal strength from the magnet, and generate an analog signal therefrom.

Further, in one or more implementations, body 602 may include a magnet (e.g., a non-moving magnet) or a piece of steel and the input device may include a magnet or a piece of steel. Attraction between the magnet and the piece of steel may create a detent effect that can create a detent effect.

An input can be provided to the wearable electronic device 600 by the user engaging input device 601. For instance, a user can engage the input structure 601 when a finger of the user makes physical contact with input device 601 and actuates the input structure 601. In one or more implementations, user engagement with the input structure 601 results in rotation of the input structure 601 about the body 602. The physical actuation (e.g., rotation) of the input structure 601 produces a signal that is received and recognized by a processor (described below) or other circuitry of the device. In one or more implementations, the physical actuation of the input structure 601 is translated by the processor into a computer-readable form. The processor then compares the rotation of the input structure 601 by the user to a plurality of stored manipulations based on the input.

Turning to FIGS. 7A to 7F, illustrated therein are exploded right side, front, left side, right side perspective, top and left side perspective views, respectively, of the wearable electronic device 600 of FIG. 6.

In one or more implementations, body 602 may also include one or more second input structure (e.g., buttons) 624. In one or more implementations, second input structure 624 may be buttons, keys or switches having a mechanical switch (e.g., momentary contact switch) and including a depressible component that makes contact with a conductive element in response to a user applying a force to the depressible component. Upon release of the force applied by the user, the depressible component may thereafter return to a default position in response to an expansion of a spring or other biasing element. In one or more implementations, the second input structure(s) 624 may be electrically operated by sensing touch or proximity (e.g., by measuring capacitance of a user's finger). Any type of button is within the scope of the wearable electronic device 600, and one button 624 may be a first type while another button 624 may be a second type. While two buttons 624 are illustrated in this implementation, any number of buttons are within the scope of the wearable electronic device 600 described herein.

Second input device 624 can be mechanical, electromechanical, and/or sensor (e.g., a membrane sensor)-based, and in more general terms can provide an actuation surface for receiving a user-applied actuation force or action.

Second input devices 624 can extend from outer surface 606 of body 602 and be laterally offset from input structure 601. For instance, in the implementation shown in FIGS. 6 and 7, second input structures 624 are laterally offset from a portion of outer surface 606 where input structure 601 is mounted and positioned within the outer edges 631, 632 of the body 602.

Buttons 624 extend from surface 606 in a direction towards second side 607 of body 606.

In this implementation, input structure 601 is rotatably mounted between two body edges 631, 632 of body 602. Body edges 631, 632 extend outwardly from surface 606 of body 602 and surround body 602.

Figure 8:
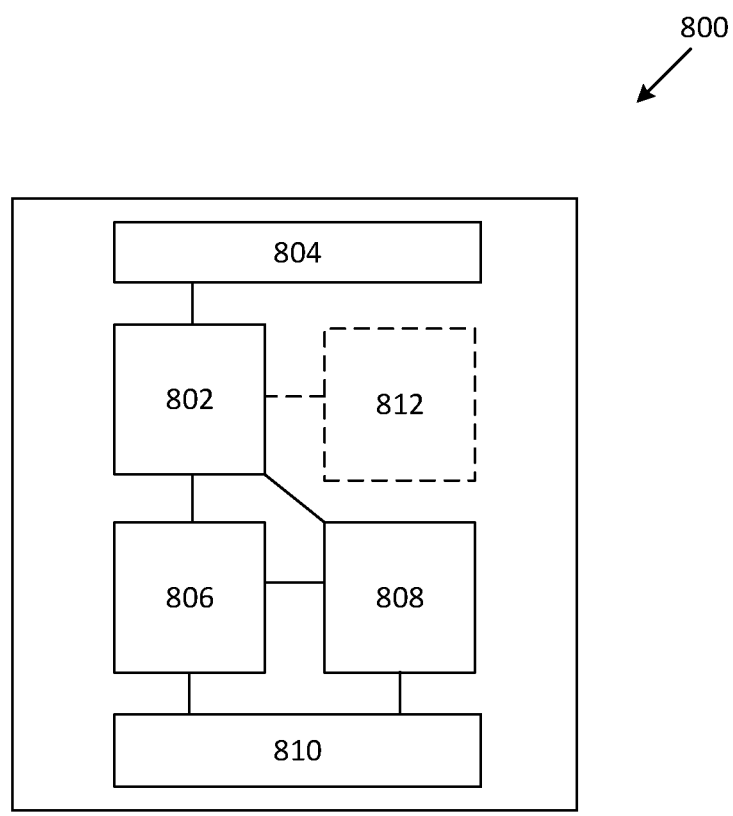
FIG. 8 is a block diagram illustrating a wearable electronic device, according to one embodiment.

FIG. 8 is a block diagram illustrating a wearable electronic device 800 with a removable control module in accordance with some implementations. Wearable electronic device 800 can represent any one of wearable devices 100, 300 and 600 as described herein, or any combination thereof. Device 800 includes memory 802 that optionally includes one or more computer readable storage mediums, one or more processors (CPUs, microprocessors, application specific integrated circuits (ASICs)) 804, radio(s) 806, an input/output (I/O) subsystem 808 (i.e., a detector system) and a power system 810. Wearable electronic device 800 optionally includes one or more sensors 812.

Memory 802 optionally includes high-speed random access memory and optionally also includes non-volatile memory, such as one or more magnetic disk storage devices, flash memory devices, or other non-volatile solid-state memory devices. Access to memory 802 by other components of wearable electronic device 800, such as processor(s) 804 is, optionally, controlled by a memory controller (not shown).

The one or more processors 804 run or execute various software programs and/or sets of instructions stored in memory 802 to perform various functions for wearable electronic device 800 and to process data.

One or more radios (e.g., radio frequency, microwave frequency) 806 and associated antennas receive and send radio signals, also called electromagnetic signals. Radio(s) 806 converts electrical signals to/from electromagnetic signals and communicates with communications networks and other communications devices via the electromagnetic signals. Radio(s) 806 optionally includes circuitry for performing these functions, including but not limited to an antenna system, a transceiver, a receiver, a transceiver, one or more amplifiers, a tuner, one or more oscillators, a digital signal processor, a CODEC chipset, a subscriber identity module (SIM) card, memory, and so forth. Radio(s) 806 optionally communicate with networks, such as the Internet, an intranet and/or a wireless network, such as a cellular telephone network, a wireless local area network (LAN) and/or a metropolitan area network (MAN), and other devices by wireless communication.

I/O subsystem 808 couples input/output peripherals of wearable electronic device 800, such as input device 820 and other input or control devices, with a peripherals interface (not shown). I/O subsystem 808 includes a controller for the input device 820.

Power system 810 is generally for powering the various components of the wearable electronic device 800. Power system 810 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The recharging system may be configured to receive wired power (from, e.g., a micro-USB charger) or wireless power transmitted via electromagnetic waves and to provide the wired power to the one or more power sources.

Wearable electronic device 800 optionally also includes one or more accelerometers, gyroscopes, and/or magnetometers (e.g., as part of an inertial measurement unit (IMU)) vibration, shock, impact, and any other appropriate inertial sensors (herein referred to as impact sensors) to obtain information concerning the position (e.g., attitude) acceleration, orientation, angular velocity, and/or vibration of the wearable electronic device. In one or more implementations, these sensors can be coupled with a peripherals interface (not shown)

It should be appreciated that wearable electronic device 800 is only one example of a wearable electronic device, and that wearable electronic device 800 optionally has more or fewer components than shown, optionally combines two or more components, or optionally has a different configuration or arrangement of the components. The various components shown in FIG. 8 are implemented in hardware, software, firmware, or a combination thereof, including one or more signal processing and/or application specific integrated circuits.

Figure 9:
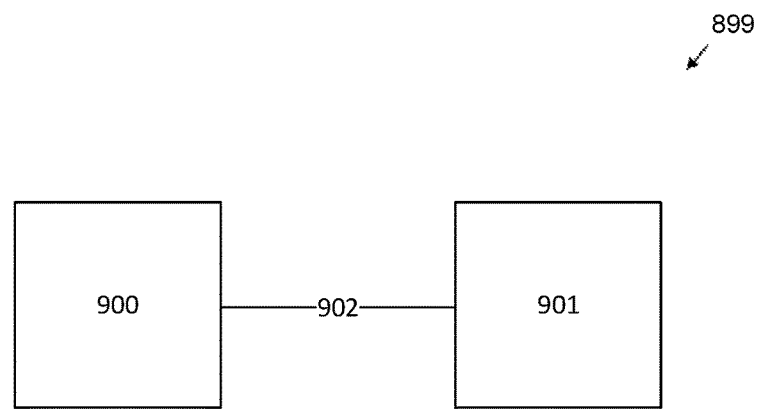
FIG. 9 is a block diagram illustrating a wearable electronic device communicating with an external electronic device, according to one embodiment.

FIG. 9 is a block diagram illustrating a system 899 of a first wearable electronic device 900 and a second wearable electronic device 901 in accordance with one or more implementations described herein. Second wearable electronic device 901 may include a display screen displaying a user interface for viewing by the user of the first wearable electronic device 900.

Second wearable electronic device 901 may be any wearable electronic device capable of being controlled by the first wearable electronic device 900 according to one or more implementations described herein. For example, the second wearable electronic device 901 may be a wearable heads-up display to be worn on a head of a user, wherein the wearable heads-up display that includes at least one transparent display positioned in a field of view of the user when the wearable heads-up display is worn on the head of the user. The second wearable electronic device 901 may also include a wireless receiver and a processor communicatively coupled to both the at least one transparent display and the wireless receiver. In one or more implementations, second wearable electronic device 901 may include a display screen displaying a user interface for viewing by the user of the wearable electronic device 900.

First wearable electronic device 900 communicates with second wearable electronic device 901 via a communications channel, for instance a communication network 902, which may be a wired connection, a Wi-Fi network, WiMAX, Zigbee, Z-Wave, Bluetooth™, Bluetooth™ Low Energy, near-field communication, or any other type of connection capable of providing uni-directional or bi-directional communication between the second wearable electronic device 901 and the first wearable electronic device 900.

According to at least one implementation, the first wearable electronic device 900 can be an electronic ring according to any one or more of the implementations described above, and the second wearable electronic device 901 can be a wearable heads-up display to be worn on a head of a user. Optionally, the system 899 can also include a connecting case (not shown) for the wearable electronic devices. An example of a similar system is described in US Patent Application Publication 2017-0097753.

Figures 10A, 10B, 10C:
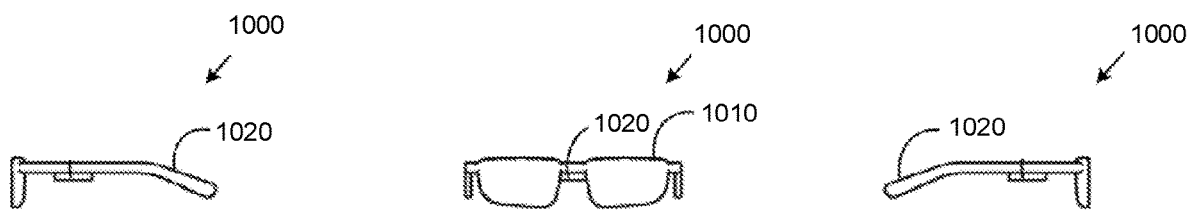
FIGS. 10A to 10C are left side, front and right side views of a second wearable electronic device, according to one embodiment.

One implementation of a wearable heads-up display 901 is shown as glasses 1000 in FIGS. 10A to 10C. The glasses 1000 can include a frame 1020 holding a pair of lenses 1010. The frame 1020 may include a bridge between the lenses, as well as a right arm and a left arm. The shape of the glasses is shown for illustrative purposes and is not limited to the illustrated shape. Other shapes can be used. Furthermore, other wearable heads-up display units 901 can be used. For example, wearable heads-up display 901 may cover a portion of the user's head, such as a helmet, may rest on top of a user's head, and/or wrap around a user's head, such as a headband. Wearable heads-up display unit 901 may further include fastening or elastic members to secure to the user's head.

In at least one implementation of system 899, the wearable electronic ring 900 is sized and shaped to be worn on a first finger of the user. The wearable electronic ring 900 includes a rotatable input structure that can be controllably rotated by a second finger of the user when the wearable electronic ring 900 is worn on the first finger of the user.

In at least one implementation of system 899, the wearable heads-up display 901 includes at least one transparent display positioned in a field of view of the user when the wearable heads-up display is worn on the head of the user, a wireless receiver; and a processor communicatively coupled to both the at least one transparent display and the wireless receiver.

In at least one implementation of system 899, the wearable electronic ring 900 can include a processor that mediates communicative coupling between the rotatable input device and the wireless transmitter. The processor can process the input and cause the wireless transmitter to wirelessly transmit a signal to the wireless receiver of the wearable heads-up display 901.

In at least one implementation of system 899, the wearable heads-up display 901 can include a non-transitory processor-readable medium that stores processor-executable instructions that, when executed by the processor of the wearable heads-up display 901, cause the at least one transparent display to display the selfie image to the user.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable electronic device wearable on a first finger of a user, the wearable electronic device comprising:
   a body defining an aperture therethrough, the aperture sized and shaped to receive the first finger of the user;
   a processor housed by the body;
   a first manipulable input structure angularly offset from the body and rotatably coupled to the body, the first manipulable input structure controllably rotatable about the body by a second finger of the user, wherein a center axis of the first manipulable input structure is noncoaxial with a center axis of the body;
   a detector system carried by the body and communicatively coupled to the processor, the detector system to detect rotations of the first manipulable input structure about the body; and
   a transmitter communicatively coupled to the processor, the transmitter to transmit signals to an external electronic device in response to rotations of the first manipulable input structure about the body.

2. The wearable electronic device of claim 1, wherein the first manipulable input structure is at least partially disposed at an outer peripheral surface of the body.

3. The wearable electronic device of claim 1, wherein the first manipulable input structure is annular about the center axis of the first manipulable input structure and controllably rotatable about the center axis of the first manipulable input structure.

4. The wearable electronic device of claim 3, wherein the center axis of the first manipulable input structure intersects the center axis of the body.

5. The wearable electronic device of claim 1, further comprising at least a second manipulable input structure carried by and extending from an outer surface of the body of the wearable electronic device and laterally offset from the first manipulable input structure.

6. The wearable electronic device of claim 4, wherein the second manipulable input structure includes a button.

7. The wearable electronic device of claim 5, wherein the second manipulable input structure is laterally offset from the first manipulable input structure on the body.

8. The wearable electronic device of claim 5, wherein the second manipulable input structure extends from an outer surface of the body towards an inner surface of the first manipulable input structure and is positioned between the first manipulable input structure and the body.

9. The wearable electronic device of claim 5, wherein the second manipulable input structure extends from the body at a position between two lateral edges of the body.

10. The wearable electronic device of claim 1, wherein the detector system is an analog system.

11. The wearable electronic device of claim 1, wherein the detector system is a digital system.

12. The wearable electronic device of claim 1, wherein the detector system is a combination of an analog system and a digital system.

13. The wearable electronic device of claim 1, wherein the detector system includes an optical sensor carried by one of an outer surface of the body and an inner surface of the first manipulable input structure, the optical sensor to sense markings detectable by the optical sensor placed on the other of the outer surface of the body and the inner surface of the first manipulable input structure.

14. The wearable electronic device of claim 1, wherein the detector system includes a mechanical switch carried by one of an outer surface of the body and an inner surface of the first manipulable input structure, the mechanical switch intermittently activatable by one or more strikers carried by the other of the outer surface of the body and the inner surface of the first manipulable input structure.

15. The wearable electronic device of claim 1, wherein the detector system includes at least one magnet carried by one of an outer surface of the body or an inner surface of the first manipulable input structure and a Hall effect sensor carried by the other of the outer surface of the body or the inner surface of the first manipulable input structure.

16. The wearable electronic device of claim 1, wherein the body has an annular shape to be worn on the first finger of the user.

17. The wearable electronic device of claim 1, wherein rotation of the first manipulable input structure about the body provides tactile feedback to the user.

18. The wearable electronic device of claim 1, further comprising a power source communicatively coupled to the processor, the detector system, and the transmitter to provide power to at least the processor, the detector system, and the transmitter.

19. A wearable system comprising:
   a wearable heads-up display to be worn on a head of a user, wherein the wearable heads-up display comprises:

at least one transparent display positioned in a field of view of the user when the wearable heads-up display is worn on the head of the user;
a wireless receiver; and
a processor communicatively coupled to both the at least one transparent display and the wireless receiver; and
a wearable electronic ring to be worn on a first finger of the user, the wearable electronic ring comprising:
a body defining an aperture therethrough, the aperture sized and shaped to receive the first finger of the user;
a first manipulable input structure angularly offset from the body and rotatably coupled to the body, the first manipulable input structure controllably rotatable about the body by a second finger of the user, wherein a center axis of the first manipulable input structure is noncoaxial with a center axis of the body;
a detector system carried by the body and communicatively coupled to the processor, the detector system to detect rotations of the first manipulable input structure about the body; and
a transmitter communicatively coupled to the processor, the transmitter to transmit signals to an external electronic device in response to rotations of the first manipulable input structure about the body.

* * * * *